(12) United States Patent
Dong et al.

(10) Patent No.: US 12,399,367 B2
(45) Date of Patent: Aug. 26, 2025

(54) NEAR-EYE DISPLAY DEVICE

(71) Applicants: Beijing BOE Optoelectronics Technology Co., Ltd., Beijing (CN); BOE Technology Group Co., Ltd., Beijing (CN)

(72) Inventors: Ruijun Dong, Beijing (CN); Hao Zhang, Beijing (CN); Lili Chen, Beijing (CN); Yulong Wu, Beijing (CN); Ke Li, Beijing (CN); Chenru Wang, Beijing (CN); Jiarong Bai, Beijing (CN); Na Han, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 553 days.

(21) Appl. No.: 17/789,709

(22) PCT Filed: Aug. 4, 2021

(86) PCT No.: PCT/CN2021/110678
§ 371 (c)(1),
(2) Date: Jun. 28, 2022

(87) PCT Pub. No.: WO2022/048384
PCT Pub. Date: Mar. 10, 2022

(65) Prior Publication Data
US 2023/0038591 A1 Feb. 9, 2023

(30) Foreign Application Priority Data
Sep. 7, 2020 (CN) .......................... 202010931174.5

(51) Int. Cl.
G02B 27/01 (2006.01)
G02B 5/08 (2006.01)
(Continued)

(52) U.S. Cl.
CPC ....... *G02B 27/0172* (2013.01); *G02B 5/0808* (2013.01); *G02B 5/10* (2013.01); *G02B 27/283* (2013.01); *G02B 2027/0178* (2013.01)

(58) Field of Classification Search
CPC .... G02B 27/0172; G02B 5/0808; G02B 5/10; G02B 27/283; G02B 2027/0178
(Continued)

(56) References Cited

U.S. PATENT DOCUMENTS

2016/0278695 A1    9/2016  Wang et al.

FOREIGN PATENT DOCUMENTS

CN    108681073 A    10/2018
CN    111103693 A    5/2020
(Continued)

*Primary Examiner* — Wyatt A Stoffa
*Assistant Examiner* — Grant A Gagnon
(74) *Attorney, Agent, or Firm* — IPro, PLLC

(57) ABSTRACT

A near-eye display device, including: a display screen (1) used for image display; an imaging lens (2) located at a light emission side of the display screen (1) and used for imaging a displayed image of the display screen (1); a flat plate (3) located on the side of the imaging lens (2) facing away from the display screen (1) and obliquely arranged relative to the optical axis of the imaging lens (2); a phase retardation layer (4) located on the side of the flat plate (3) facing the imaging lens (2); a polarization beam-splitting layer (5) located between the phase retardation layer (4) and the flat plate (3); a polarizing layer (6) located between the polarization splitting layer (5) and the flat plate (3); and a curved mirror (7).

12 Claims, 5 Drawing Sheets

(51) Int. Cl.
  *G02B 5/10*  (2006.01)
  *G02B 27/28* (2006.01)
(58) Field of Classification Search
  USPC .......................................................... 359/267
  See application file for complete search history.

(56) References Cited

FOREIGN PATENT DOCUMENTS

| | | |
|---|---|---|
| CN | 111158154 A | 5/2020 |
| CN | 111221130 A | 6/2020 |
| CN | 111323905 A | 6/2020 |
| CN | 111880311 A | 11/2020 |
| CN | 212460200 U | 2/2021 |
| CN | 213069318 U | 4/2021 |

NEAR-EYE DISPLAY DEVICE

CROSS REFERENCE TO RELATED APPLICATIONS

The present application is a US National Stage of International Application No. PCT/CN2021/110678, filed on Aug. 4, 2021, which claims the priority of the Chinese patent application No. 202010931174.5 filed to the China Patent Office on Sep. 7, 2020, and entitled "Near-Eye Display Device", of which the entire contents are incorporated herein by reference.

FIELD

The present disclosure relates to the field of display, in particular to a near-eye display device.

BACKGROUND

In recent years, with continuous development of virtual reality (VR) and augmented reality (AR for) technologies, near-eye display products are originally applied in the military field, and have gradually been widely applied in civil fields, such as film and television, education, and medical care.

A near-eye display optical system has characteristics of being small in size, light in weight, and capable of realizing stereoscopic display, and has a good development prospect. However, in a current near-eye display optical system, light is refracted and reflected in a form of a flat glass coated with a transflective film, and the light reflected for two times on upper and lower surfaces of the flat glass can be imaged by an imaging system, thus there will also be a ghosting problem when human eyes watch images, so as to affect a visual effect.

SUMMARY

An embodiment of the present disclosure provides a near-eye display device, including:
- a display screen, configured to display an image;
- an imaging lens, located at a light emitting side of the display screen and configured to image a displayed image of the display screen;
- a flat plate, located on one side, facing away from the display screen, of the imaging lens and obliquely arranged relative to an optical axis of the imaging lens;
- a phase retardation layer, located on one side, facing the imaging lens, of the flat plate;
- a polarization beam-splitting layer, located between the phase retardation layer and the flat plate; where the polarization beam-splitting layer is configured to transmit first linearly polarized light and reflect second linearly polarized light having a polarization direction perpendicular to that of the first linearly polarized light;
- a polarizing layer, located between the polarization beam-splitting layer and the flat plate, where the polarizing layer is configured to transmit the first linearly polarized light and absorb the second linearly polarized light; and
- a curved mirror, located on a reflection light path of the polarization beam-splitting layer and located on one side, facing away from the flat plate, of the phase retardation layer; where the curved mirror is configured to reflect reflected light of the polarization beam-splitting layer to a position of human eyes and transmit ambient light.

In some embodiments of the present disclosure, a transmission axis of the polarization beam-splitting layer is parallel to a transmission axis of the polarizing layer.

In some embodiments of the present disclosure, the polarizing layer is attached to a surface of the flat plate; and the phase retardation layer, the polarization beam-splitting layer and the polarizing layer are attached to each other.

In some embodiments of the present disclosure, an anti-reflecting film is arranged on a surface of one side, facing away from the polarizing layer, of the flat plate.

In some embodiments of the present disclosure, the phase retardation layer is a quarter-wave plate; and an included angle between an optical axis of the quarter-wave plate and a transmission axis of the polarization beam-splitting layer is 45°.

In some embodiments of the present disclosure, an included angle between the flat plate and the optical axis of the imaging lens is 45°.

In some embodiments of the present disclosure, the display screen is one of a liquid crystal display, an organic light emitting diode display, a miniature organic light emitting diode display, or a light emitting diode display.

In some embodiments of the present disclosure, the imaging lens includes at least one lens; and the lens adopts one of a spherical lens, an aspherical lens or a free-form lens.

In some embodiments of the present disclosure, the curved mirror adopts one of a spherical lens, an aspherical lens or a free-form lens.

In some embodiments of the present disclosure, a transflective film is arranged on a surface of one side of the curved mirror.

In some embodiments of the present disclosure, reflectivity of the transflective film ranges from 50% to 70%.

In some embodiments of the present disclosure, the near-eye display device is glasses or a helmet; and the curved mirror is multiplexed as an ophthalmic lens of the glasses or the helmet.

BRIEF DESCRIPTION OF THE DRAWINGS

In order to illustrate the technical solution of the embodiments of the present disclosure more clearly, accompanying drawings needing to be used in the embodiments of the present disclosure will be introduced below briefly. Obviously, the accompanying drawings introduced below are only some embodiments of the present disclosure, those skilled in the art can further obtain other drawings according to these accompanying drawings without inventive efforts.

DETAILED DESCRIPTION OF THE EMBODIMENTS

Figure 1:
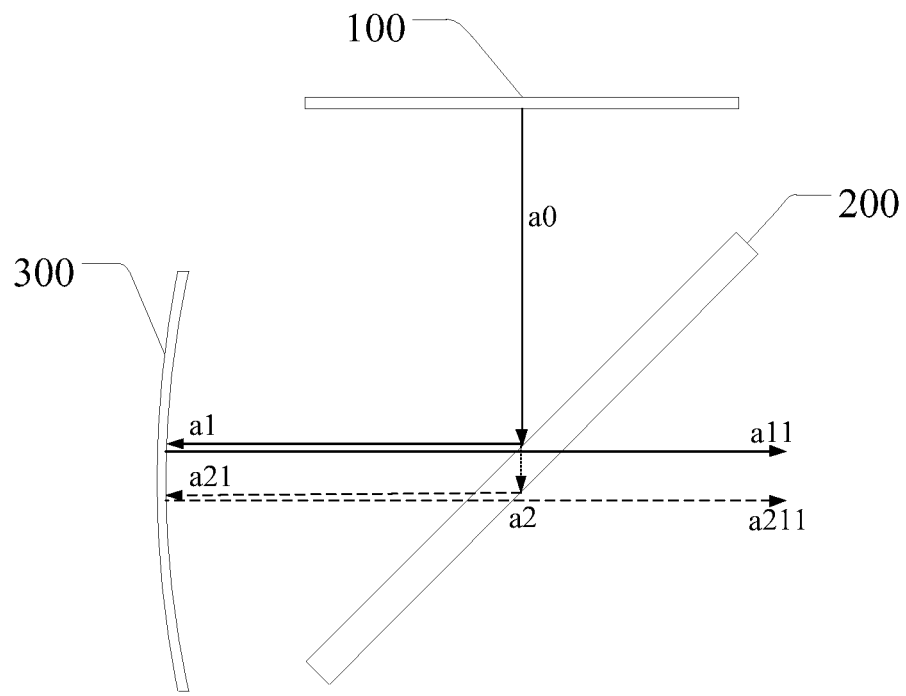
FIG. 1 is a first schematic diagram of a light path of a near-eye display device in the related art.

In order to make the above objects, features and advantages of the present disclosure more clearly understood, the present disclosure will be further described below with reference to accompanying drawings and embodiments. However, exemplary implementation may be implemented in various forms and should not be construed as limited to the implementations set forth herein; rather, these implementations are provided so that the present disclosure will be more thorough and complete, and the concept of the exemplary implementation is fully conveyed to the skilled in the art. The same reference numerals in the accompanying drawings denote the same or similar structures, and thus their repeated descriptions will be omitted. The words expressing position and direction described in the present disclosure are all described by taking the accompanying drawings as an example, but changes may also be made as required, and the made changes are all contained in the protection scope of the present disclosure. The accompanying drawings of the present disclosure are only configured to illustrate a relative positional relationship and do not represent actual scales.

A near-eye display device refers to display device worn on eyes of a user, for example, the near-eye display device is usually presented in a form of glasses or a helmet. The near-eye display device may provide the user with AR and VR experiences. An AR near-eye display technology is to superimpose a virtual image generated by the near-eye display device and a real image of a real world for displaying, so that the user can see the final enhanced real image on a screen. A VR near-eye display technology is to display images of left and right eyes on near-eye displays corresponding to the left and right eyes respectively, and the left and right eyes can synthesize stereoscopic vision in the brain after obtaining image information with differences respectively.

A current near-eye display device includes a coaxial refractive and reflective optical system and a waveguide optical system. Compared with other optical systems, the coaxial refractive and reflective optical system has a hollow structure, and a more compact optical framework, which can realize a light and thin design. In addition, the coaxial refractive and reflective optical system has higher image quality, and has a larger field of view than the waveguide optical system, and the field of view of the coaxial refractive and reflective optical system can be extended to 50° or even larger. The coaxial refractive and reflective optical system has relatively simple requirements for optical design, thereby avoiding use of a surface type that is too difficult to process, and reducing production cost.

FIG. 1 is a first schematic diagram of a light path of a near-eye display device commonly used at present.

Referring to FIG. 1, in the current near-eye display device, the light from an image source 100 is refracted and reflected in a form of flat glass 200 coated with a transflective film. It can be seen from FIG. 1 that: when light a0 emitted from an image source 100 is incident on the flat glass 200, a part of the light is reflected by an upper surface thereof to form reflected light a1, and the reflected light a1 is incident on a reflective mirror 300 and then reflected again to form reflected light a11 for human eye viewing. At the same time, when the light a0 emitted from the image source 100 is incident on the flat glass 200, another part of the light is transmitted to form transmitted light a2, the transmitted light a2 is then reflected by a lower surface of the flat glass 200 to form reflected light a21, and the reflected light a21 is incident on the reflective mirror 300 and then is reflected again to form reflected light a211. Both the light a11 and the light a211 can be incident on the human eyes, and then the human eyes will view two images, causing a ghosting problem and affecting a visual effect.

Figure 2:
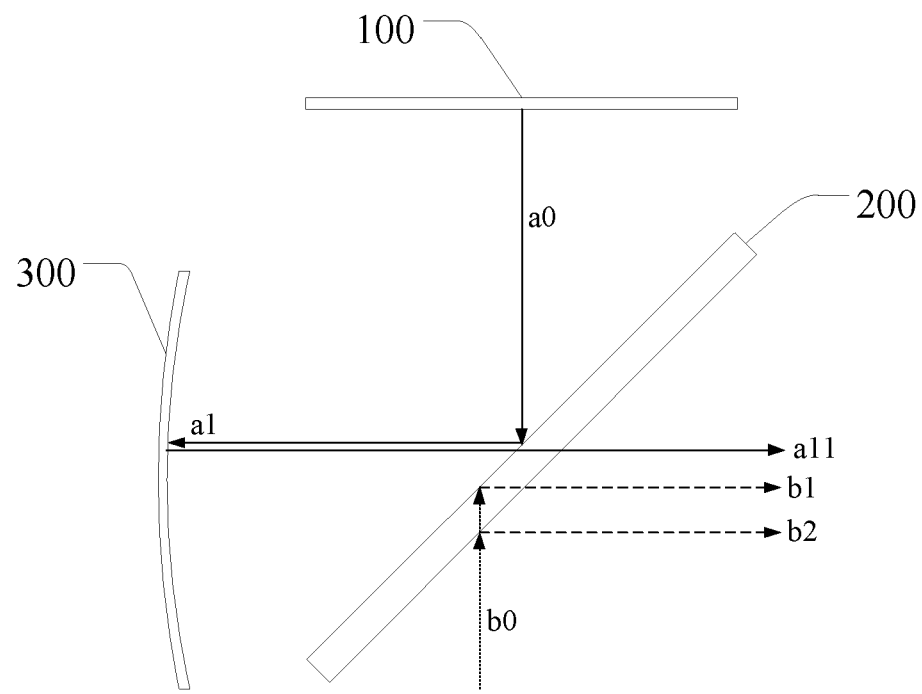
FIG. 2 is a second schematic diagram of a light path of a near-eye display device in the related art.

FIG. 2 is a second schematic diagram of the light path of the near-eye display device commonly used at present.

Referring to FIG. 2, because the surface of the flat glass 200 is provided with a transflective film, in addition to the light emitted from the image source 100 being incident on the flat glass 200, ambient light b0 may also be incident on the flat glass 200 from a lower side of the near-eye display device. The ambient light b0 is reflected on the upper and lower surfaces of the flat glass 200 respectively to form reflected light b1 and b2. In this way, the human eyes may also receive ambient light from below when viewing a displayed image, which affects viewing of an effective image and an external scene right ahead.

Figure 3:
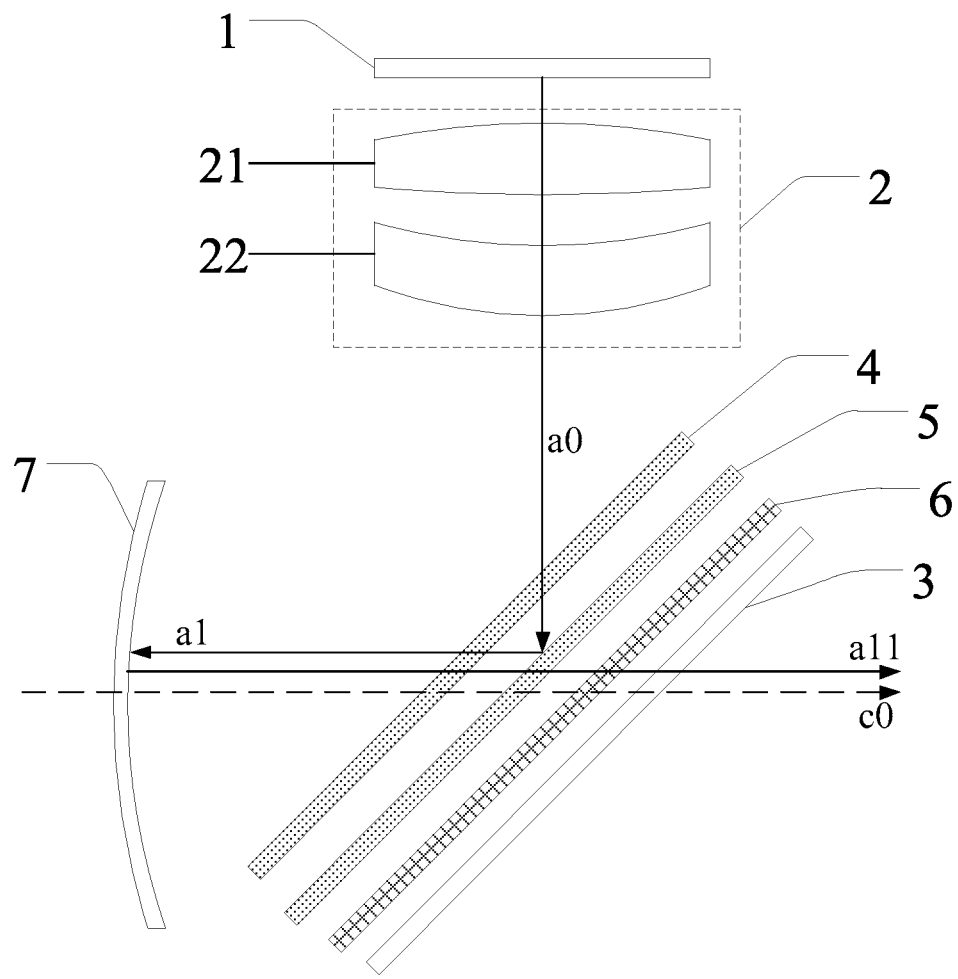
FIG. 3 is a first schematic structural diagram of a near-eye display device provided by an embodiment of the present disclosure.

In view of this, embodiments of the present disclosure provide a near-eye display device. FIG. 3 is a first schematic structural diagram of a near-eye display device provided by an embodiment of the present disclosure. Referring to FIG. 3, the near-eye display device provided by the embodiment of the present disclosure includes: a display screen 1, an imaging lens 2, a flat plate 3, a phase retardation layer 4, a polarization beam-splitting layer 5, a polarizing layer 6 and a curved mirror 7.

The display screen 1 is configured to display images. The display screen 1 is used as an image source for displaying images. The near-eye display device may include two display screens 1, which are configured to display left and right eye images respectively, and mutually-independent imaging systems are adopted to image the displayed images of the two display screens 1 respectively. When the human eyes view the left and right eye images, a certain parallax is generated, resulting in a stereoscopic display effect.

A size of the display screen 1 in the near-eye display device is usually small; and in order to display more image details, a display screen with a higher resolution may be adopted to provide a more delicate displayed image.

The display screen 1 may be one of a liquid crystal display (LCD), a light emitting diode (LED) display or an organic light emitting diode (OLED) display, which is not limited here.

The LCD is mainly composed of a backlight module and a liquid crystal display panel. The liquid crystal display panel itself does not emit light, and needs to rely on a light source provided by the backlight module to achieve brightness display. An imaging principle of the LCD is to place a liquid crystal between two pieces of conductive glass, to cause an electric field effect of twist of liquid crystal molecules driven by an electric field between two electrodes, so as to control a transmission or shielding function of a backlight source, to display the images. If a color filter is added, color images may be displayed. A liquid crystal display technology is mature, and a liquid crystal display screen has low cost and excellent performance.

The LED display is a display screen composed of an LED array, the LED is used as a display sub-pixel, and image display may be achieved by controlling display brightness of each LED. The LED display has characteristics of high brightness, low power consumption, low voltage requirement, and compact and convenient equipment. Using the LED display as the display screen 1 in the near-eye display device is beneficial to realize miniaturization of the near-eye display device.

The OLED display is also known as an organic electroluminesence display, and an organic light emitting semiconductor display. The OLED display is a current-type organic light emitting device, which is a phenomenon of luminescence caused by injection and recombination of carriers; and luminous intensity is proportional to injected current. Under action of the electric field, in the OLED, holes generated by an anode and electrons generated by a cathode may move to be injected into a hole transport layer and an electron transport layer respectively, and migrate to a light emitting layer. When the holes and the electrons meet in the light emitting layer, energy excitons are generated, thereby exciting light emitting molecules and finally generating visible light. The OLED display is a self-luminous display screen, so it does not need to be equipped with a backlight module, and overall thickness of the device is small, which is beneficial to the miniaturization of the near-eye display device and is more beneficial to installation of a whole machine.

The miniature organic light emitting diode display is to miniaturize a light emitting unit of the organic light emitting diode, so that more pixels can be arranged in a limited size, and resolution of the display screen is improved.

The imaging lens 2 is located at a light emitting side of the display screen 1 and configured to image a displayed image of the display screen 1.

The size of the display screen 1 in the near-eye display device is small, and the displayed image cannot be directly viewed by the human eyes. Therefore, the imaging lens 2 needs to be arranged on the light emitting side of the display screen 1, and after the displayed image is enlarged and imaged, the image is observed by the human eyes.

In the embodiments of the present disclosure, the imaging lens 2 includes at least one lens. Taking the near-eye display device shown in FIG. 2 as an example, the imaging lens 2 in the embodiment of the present disclosure includes a first lens 21 and a second lens 22. The first lens 21 is located on the light emitting side of the display screen 1; and the second lens 22 is located on one side, facing away from the display screen 1, of the first lens 21. The first lens 21 may be a positive lens, and the second lens 22 may be a negative lens.

During specific implementation, the imaging lens 2 may also adopt one lens to simplify the structure; or, the imaging lens 2 may also adopt the more than three lenses, thereby optimizing the imaging quality. In the embodiments of the present disclosure, only the imaging lens 2 including the two lenses is taken as an example for illustration, and the quantity of the lenses in the imaging lens 2 is not specifically limited. A type of the lens in the imaging lens 2 needs to be designed according to the actual situation, which is not limited here.

The lens in the imaging lens 2 may adopt a spherical lens, an aspherical lens or a free-form lens. The spherical lens has advantages of simple design, low assembly precision requirement and the like. Thicknesses of the aspherical lens and the free-form lens are relatively small, which can optimize the image quality. They can be selected according to actual needs during optical design.

A material of the lens in the imaging lens 2 may adopt one of glass or plastic, which is not limited here.

The flat plate 3 is located on one side facing away from the display screen 1, of the imaging lens 2; and the flat plate 3 is obliquely arranged relative to an optical axis of the imaging lens 2.

The flat plate 3 is used as a support member in the near-eye display device, and may be configured to arrange other functional film layers on its surface, thereby maintaining a set included angle relationship between the functional film layers and the imaging lens 2.

A material of the flat plate 3 may be a rigid transparent material, such as glass or plastic. Two surfaces of the flat plate 3 are parallel to each other. An included angle between a plane where the flat plate 3 is located and an optical axis of the imaging lens 2 may be 45°, which can ensure that imaging light emitted from the imaging lens is incident on the functional film layers on the surface of the flat plate 3 at 45°.

In the embodiments of the present disclosure, the functional film layers on the flat plate 3 include: the phase retardation layer 4, the polarization beam-splitting layer 5 and the polarizing layer 6. The phase retardation layer 4 is located on one side, facing the imaging lens 2, of the flat plate 3; the polarization beam-splitting layer 5 is located between the phase retardation layer 4 and the flat plate 3; and the polarizing layer 6 is located between the polarization beam-splitting layer 5 and the flat plate 3.

The phase retardation layer 4 has an effect of phase retardation. In the embodiments of the present disclosure, the phase retardation effect of the phase retardation layer 4 may be utilized to convert a polarization state of the light.

The polarization beam-splitting layer 5 is configured to transmit first linearly polarized light and reflect second linearly polarized light, and a polarization direction of the first linearly polarized light and a polarization direction of the second linearly polarized light are perpendicular to each other. In the embodiments of the present disclosure, the polarization beam-splitting layer 5 may be configured to transmit linearly polarized light (p light) having a vibration direction parallel to a light incidence surface, and reflect linearly polarized light (s light) having a vibration direction perpendicular to the light incidence surface.

The polarizing layer 6 adopts an absorbing polarizer, linearly polarized light having a polarization direction parallel to a transmission axis of the polarizing layer 6 may be transmitted, and linearly polarized light having a polarization direction perpendicular to the transmission axis of the polarizing layer 6 is absorbed. The transmission axis of the polarizing layer 6 is parallel to a transmission axis of the polarization beam-splitting layer 5. If the polarization beam-splitting layer 5 is configured to transmit the p light and reflect the s light, the polarizing layer 6 has an effect of absorbing the s light.

In the embodiments of the present disclosure, the phase retardation layer 4 may adopt a quarter-wave plate, and an included angle between an optical axis of the quarter-wave plate and the transmission axis of the polarization beam-splitting layer 5 is set to be 45°, so that when the linearly polarized light after being split by the polarization beam-splitting layer 5 passes through the quarter-wave plate again, the linearly polarized light may be converted into circularly polarized light.

The curved mirror 7 is located on a reflection light path of the polarization beam-splitting layer 5 and located on one side facing away from the flat plate 3, of the phase retardation layer 4; and the curved mirror 7 is configured to reflect reflected light of the polarization beam-splitting layer 5 to a position of human eyes and transmit ambient light.

The curved mirror 7 and the imaging lens 2 constitute an optical system for imaging the display screen 1. The curved mirror 7 may adopt one of a spherical lens, an aspherical lens or a free-form lens. The spherical lens has advantages of simple design, low assembly precision requirement and the like. Thicknesses of the aspherical lens and free-form lens are relatively small, which can optimize the image quality. They can be selected according to actual needs during optical design. A material of the curved mirror 7 may adopt one of glass or plastic, which is not limited here.

The near-eye display device provided by the embodiments of the present disclosure may be glasses or a helmet; and in this case, the curved mirror 7 may be multiplexed as an ophthalmic lens of the glasses or the helmet, thereby reducing the quantity of the ophthalmic lens used by the near-eye display device.

As shown in FIG. 3, an imaging process of the near-eye display device provided by the embodiments of the present disclosure is that: the display screen 1 displays an image, and its emitted light a0 passes through the imaging lens 2, then is incident on the phase retardation layer 4, and then is incident on the polarization beam-splitting layer 5 after passing through the phase retardation layer 4. The polarization beam-splitting layer 5 can transmit the first linearly polarized light, and at the same time can reflect the second linearly polarized light which has a polarization direction perpendicular to that of the first linearly polarized light. Then when the light a0 is incident on the polarization beam-splitting layer 5, the polarization beam-splitting layer 5 reflects a component of the second linearly polarized light in the light a0 to one side of the curved mirror 7 to form reflected light a1; the curved mirror 7 then reflects the light a1 to form reflected light a11; and the reflected light a11 can transmit through the phase retardation layer 4, the polarization beam-splitting layer 5, the polarizing layer 6 and the flat plate 3 to be emitted to the position of the human eyes. The human eye can view the image displayed on the display screen 1 when receiving the light a11.

At the same time, ambient light c0 is incident on the near-eye display device from one side of the curved mirror 7; and the ambient light c0 passes through the curved mirror 7, the phase retardation layer 4, the polarization beam-splitting layer 5, the polarizing layer 6 and the flat plate 3 to be incident on the human eyes. The human eye can view ambient scene in front when receiving the ambient light c0.

An action principle of the near-eye display device provided by the embodiments of the present disclosure on the light will be specifically described below.

Figure 4:
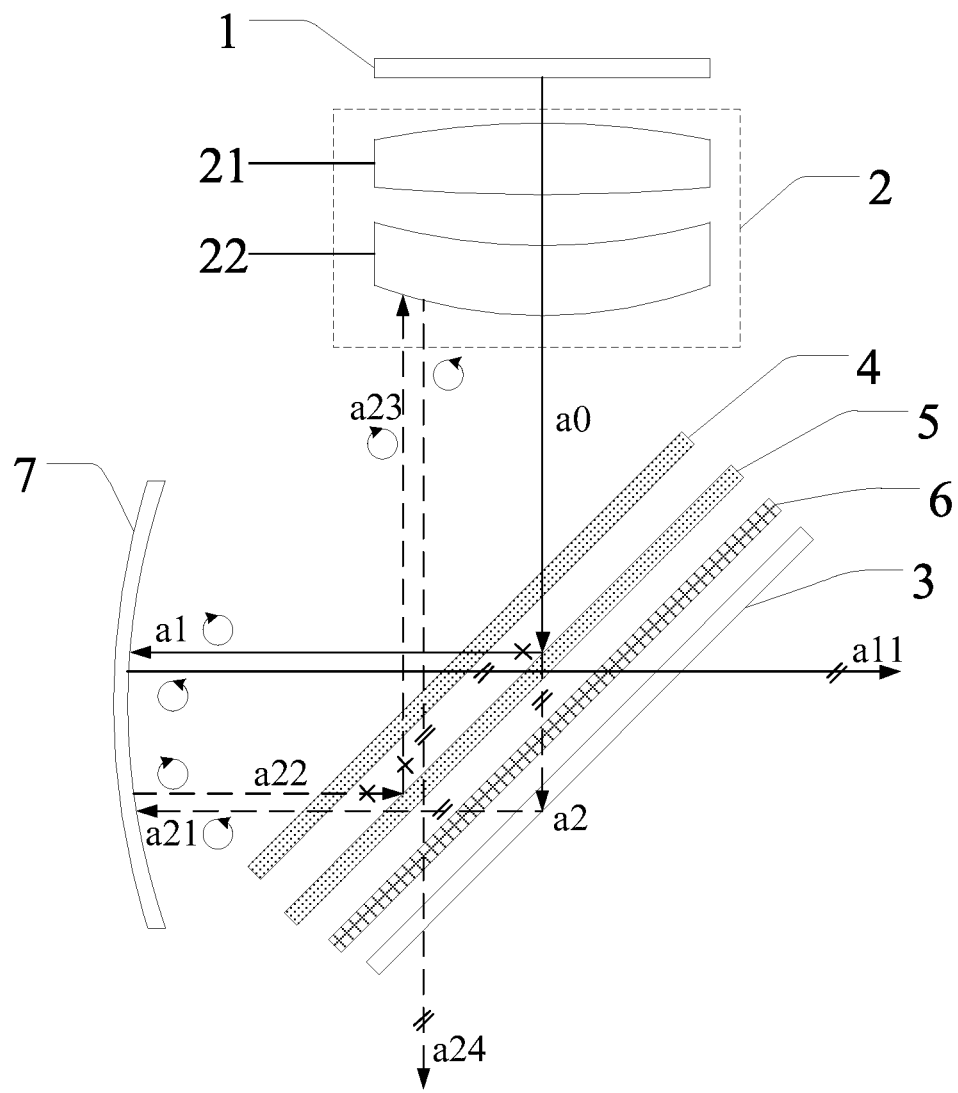
FIG. 4 is a first schematic diagram of a light path of a near-eye display device provided by an embodiment of the present disclosure.

FIG. 4 is a first schematic diagram of a light path of the near-eye display device provided by the embodiment of the present disclosure.

Referring to FIG. 4, the display screen 1 may adopt one of a liquid crystal display, an organic light emitting diode display and a light emitting diode display, so the light emitted from the display screen 1 is natural light or linearly polarized light. When the light emitted from the display screen 1 is the natural light, its emitted light a0 is incident on the phase retardation layer 4 after being imaged by the imaging lens 2, and is still the natural light after transmitting through the phase retardation layer 4. When the light emitted from the display screen 1 is the linearly polarized light, its emitted light a0 is incident on the phase retardation layer 4 after being imaged by the imaging lens 2, and is converted into circularly polarized light after transmitting through the phase retardation layer. Regardless of whether the natural light or the circularly polarized light is incident on the polarization beam-splitting layer 5, the polarization beam-splitting layer 5 can transmit a component of the first linearly polarized light and reflect a component of the second linearly polarized light. The first linearly polarized light may be linearly polarized light (p light, and "//" represents the p light in FIG. 4) having the vibration direction parallel to the incident surface, the second linearly polarized light may be linearly polarized light (s light, and "x" represents the s light in FIG. 4) having the vibration direction perpendicular to the incident surface, so that after the light a0 is incident on the polarization beam-splitting layer 5, the light a0 forms the reflected light a1 emitted toward one side of the curved mirror 7 and transmitted light a2 emitted toward one side of the flat plate 3.

The reflected light a1 (the second linearly polarized light, that is, the s light) is incident on the phase retardation layer 4 again, and is converted into the circularly polarized light after passing through the phase retardation layer 4 (for example, the s light is converted into right-circularly polarized light after passing through the phase retardation layer). The circularly polarized light is reflected by the curved mirror 7 to form reflected light a11 after being incident on the curved mirror 7; and the reflected light a11 is still the circularly polarized light which has a rotation direction opposite to that of incident light a1 (for example, the right-circularly polarized light is converted into the left-circularly polarized light). The light a11 is incident on the phase retardation layer 4 again, and is converted into the linearly polarized light after passing through the phase retardation layer 4; and a polarization direction of the linearly polarized light is opposite to a polarization direction of the incident light a1 (for example, the left-circularly polarized light is converted into the p light, namely the first linearly polarized light, after passing through the phase retardation layer). The light a11 after passing through the phase retardation layer 4 is the first linearly polarized light, which can be transmitted by the polarization beam-splitting layer 5, while the polarizing layer 6 can absorb the second linearly polarized light and transmit the first linearly polarized light, so that the light a11 may be transmitted by the polarizing layer 6 and finally be incident through the flat plate 3 to the position of the human eyes.

The transmitted light a2 (the first linearly polarized light, namely the p light) is incident on the polarizing layer 6, and the polarizing layer 6 may absorb the second linearly polarized light and transmit the first linearly polarized light, so the light a2 may be transmitted by the polarizing layer 6. After the transmitted light a2 is incident on the flat plate 3, a part of the light is reflected by the surface of the flat plate 3 to form the reflected light a21, and the reflected light a21 is still the first linearly polarized light (p light), so the light a21 may be transmitted by the polarizing layer 6 when it is incident on the polarizing layer 6 again. The light a21 transmitted by the polarizing layer 6 is still the first linearly polarized light, and when it is incident on the polarization beam-splitting layer 5 again, the polarization beam-splitting layer 5 may transmit the first linearly polarized light and reflect the second linearly polarized light, so the light a21 may be transmitted by the polarization beam-splitting layer 5. The light a21 transmitted by the polarization beam-splitting layer 5 is incident on the phase retardation layer 4 again, and is converted into the circularly polarized light after passing through the phase retardation layer 4 (for example, the p light is converted into the left-circularly polarized light after passing through the phase retardation layer). The circularly polarized light is reflected by the curved mirror 7 after being incident on the curved mirror 7 to form reflected light a22, and the reflected light a22 is still the circularly polarized light which has a rotation direction opposite to that of the incident light a21 (for example, the left-circularly polarized light is converted into the right-circularly polarized light). The light a22 is incident on the phase retardation layer 4 again, and is converted into the linearly polarized light after passing through the phase retardation layer 4; and a polarization direction of the linearly polarized light is opposite to a polarization direction of the incident light a21 (for example, the right-circularly polarized light is converted into the s light, that is, the second linearly polarized light, after passing through the phase retardation layer). The light a22 after passing through the phase retardation layer 4 is the second linearly polarized light, so when it is incident on the polarization beam-splitting layer 5 again, the light a22 can be reflected by the polarization beam-splitting layer 5 to form reflected light a23 emitted toward one side of the imaging lens 2. The reflected light a23 is the second linearly polarized light, and is converted into the circularly polarized light after being incident on the phase retardation layer 4 again (for example, the s light is converted into the right-circularly polarized light after passing through the phase retardation layer). Due to natural reflection on the surface of the imaging lens 2, so a small part of the light in the light a23 is still reflected by the imaging lens 2 to form reflected light a24, and the reflected light a24 is still the circularly polarized light which has a rotation direction opposite to a rotation direction of the light a23 (for example, the right-circularly polarized light is converted into the left-circularly polarized light). The light a24 is incident on the phase retardation layer 4 again, and is converted into the linearly polarized light by the phase retardation layer 4, and a polarization direction of the linearly polarized light is opposite to a polarization direction of the incident light a23 (for example, the left-circularly polarized light is converted into the p light, namely the first linearly polarized light, after passing through the phase retardation layer). The light a24 passing through the phase retardation layer 4 is the first linearly polarized light, so it can be transmitted by the polarization beam-splitting layer 5 after being incident on the polarization beam-splitting layer 5; and transmitted light a24 is incident on the polarizing layer 6, is transmitted by the polarizing layer 6, and finally passes through the flat plate 3 to be emitted downwards.

It can be seen that the part light a1 reflected by the polarization beam-splitting layer 5 in the imaging light a0 is finally emitted to the position of the human eyes after being reflected by the curved mirror 7 for image display. The part light a2 transmitted by the polarization beam-splitting layer 5 in the imaging light a0 is finally emitted downward after the action of various components of the near-eye display device, and will not be emitted toward the direction of the human eyes, so this part of the light will not interfere normal image display to avoid ghosting.

It is worth noting that a light splitting effect of the polarization beam-splitting layer 5 cannot achieve complete light splitting, so after the imaging light a0 is incident on the polarization beam-splitting layer 5, part of the second linearly polarized light is still transmitted. The polarizing layer 6 located under the polarization beam-splitting layer 5 has the effect of absorbing the second linearly polarized light, and therefore a small part of the transmitted second linearly polarized light is absorbed by the polarizing layer 6 when reaching the polarizing layer 6, so that the small part of the transmitted second linearly polarized light cannot reach the flat plate 3, and will not be returned to the near-eye display device, which avoids interference of this part of the light on the image display and avoids generation of ghosting.

Figure 5:
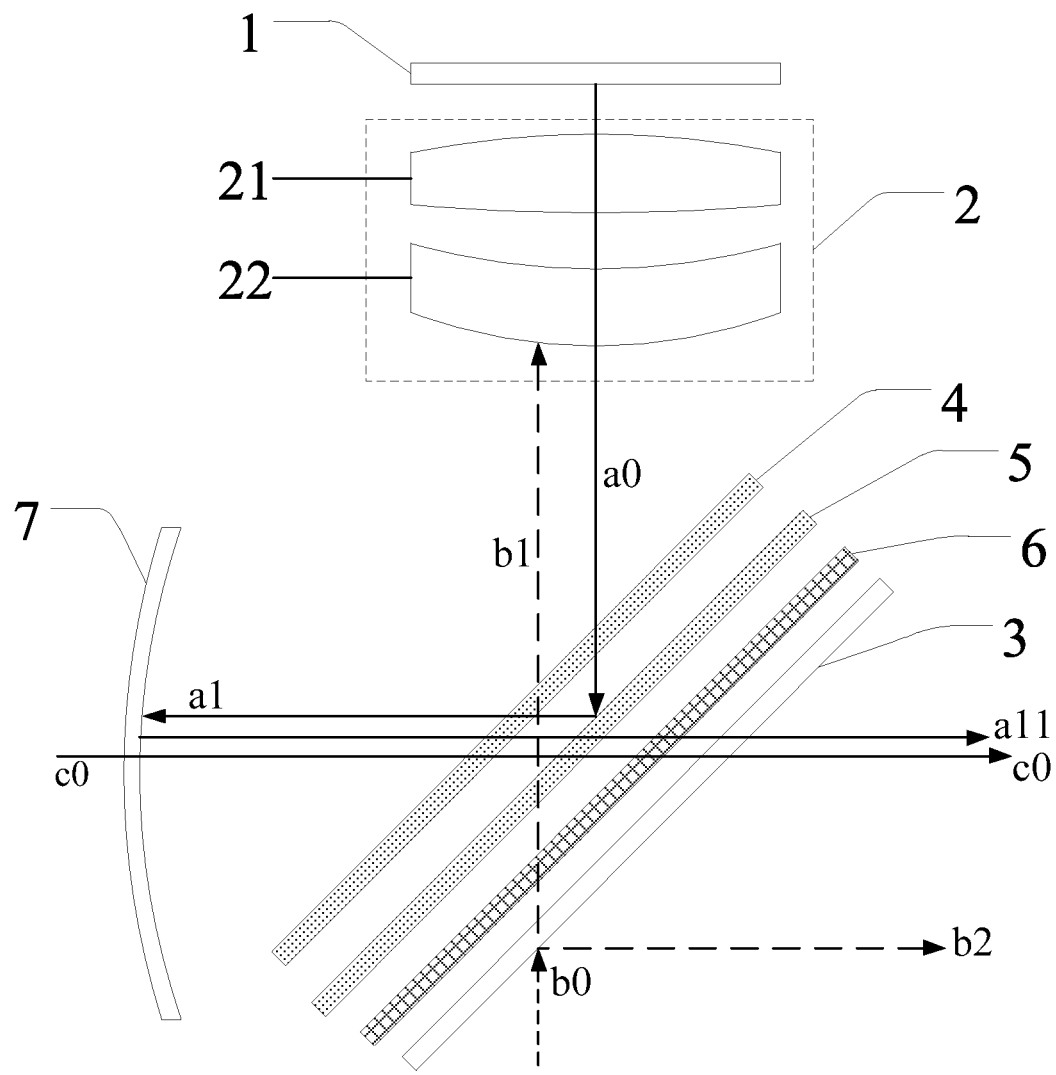
FIG. 5 is a second schematic diagram of a light path of a near-eye display device provided by an embodiment of the present disclosure.

FIG. 5 is a second schematic diagram of the light path of the near-eye display device provided by the embodiment of the present disclosure. FIG. 5 shows a light path of ambient light incident into the near-eye display device.

Referring to FIG. 5, the ambient light may be incident into the near-eye display device from one side of the curved mirror 7. As shown in FIG. 5, the ambient light c0 is the natural light, the ambient light c0 may be incident on the polarization beam-splitting layer 5 through transmission of the curved mirror 7 and the phase retardation layer 4, the polarization beam-splitting layer 5 transmits the component of the first linearly polarized light in the ambient light c0, and the transmitted light c0 is incident on the polarizing layer 6. The transmission axis of the polarizing layer 6 is parallel to the transmission axis of the polarization beam-splitting layer 5, so the light transmitted by the polarization beam-splitting layer 5 may also be transmitted by the polarizing layer 6, and finally the light c0 passes through the flat plate 3 to be emitted to the position of the human eyes.

In addition, another part of the ambient light may be incident into the near-eye display device from one side of the flat plate 3. As shown in FIG. 5, the ambient light b0 is the natural light; and when incident on the surface of the flat plate 3, a part of the ambient light is transmitted by the flat plate 3 to form transmitted light b1, and another part of the ambient light is reflected by the flat plate 3 to form reflected light b2. The ambient light b0 incident on the near-eye display device from one side of the flat plate 3 belongs to stray light. When the transmitted light b1 of the ambient light b0 after being transmitted by the flat plate 3 is incident on the polarizing layer 6, only the component of which the polarization direction is parallel to the transmission axis of the polarizing layer 6 can be transmitted, and other light is absorbed. Brightness of the transmitted light is much lower than brightness of the light for displaying images in the near-eye display device, so a light effect of secondary reflection after entering the light path can be ignored. The flat plate 3 has lower reflectivity, so the light b2 reflected by the flat plate 3 can also be ignored for the brightness of the imaging light, so the light incident from one side of the flat plate 3 into the near-eye display device will not cause interference on the imaging light, and the stray light directly below is not visible.

It can be seen that, by adopting the structure of the above near-eye display device provided by the embodiments of the present disclosure, the generation of ghosting can be effectively suppressed, and the interference of the stray light on imaging can also be eliminated at the same time, so as to optimize the viewing experience.

Figure 6:
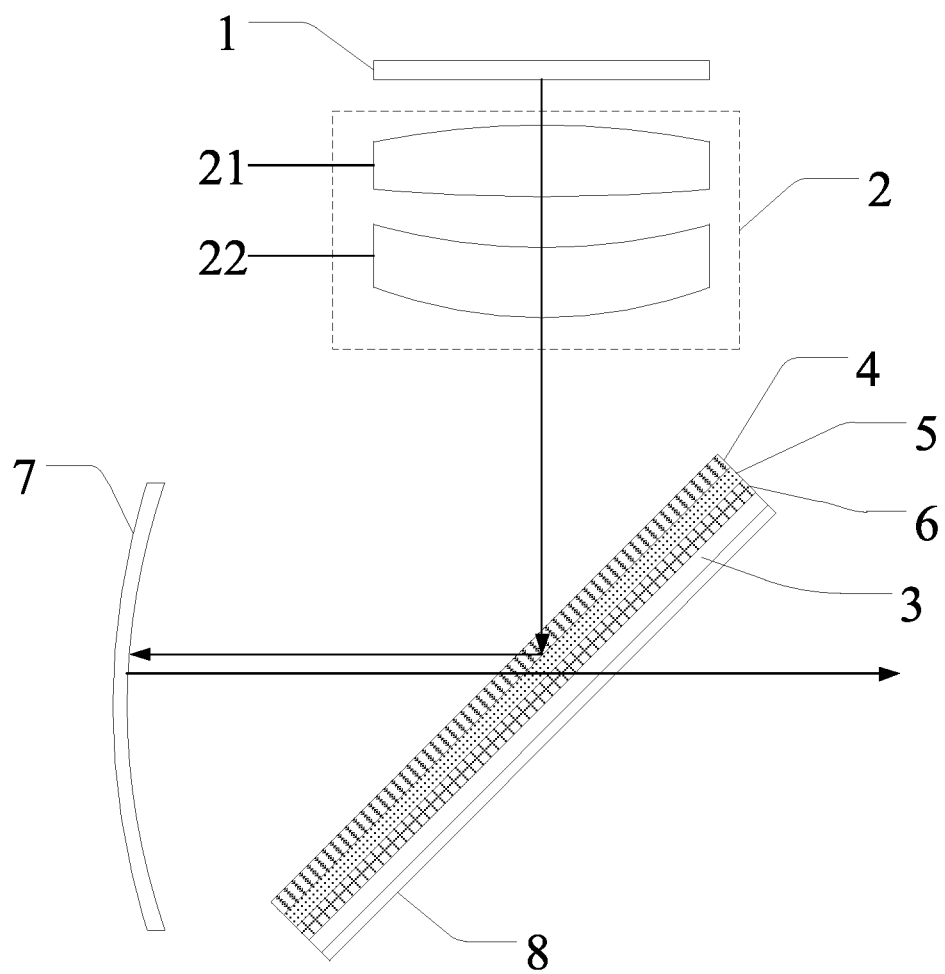
FIG. 6 is a second schematic structural diagram of a near-eye display device provided by an embodiment of the present disclosure.

FIG. 6 is a second schematic structural diagram of the near-eye display device provided by the embodiment of the present disclosure.

In the embodiment of the present disclosure, the polarizing layer 6 and the polarization beam-splitting layer 5 are usually made of a soft film material, which needs to be supported by a base material, while the material of the flat plate 3 may adopt a rigid transparent material such as glass or plastic. As shown in FIG. 6, the polarizing layer 6 may be attached to the surface of the flat plate 3, then the polarization beam-splitting layer 5 is attached to the surface of the polarizing layer 6, and the phase retardation layer 4 is attached to the surface of the polarization beam-splitting layer 5; so that the phase retardation layer 4, the polarization beam-splitting layer 5 and the polarizing layer 6 are attached to each other, are attached to the flat plate 3 together, and are supported by the flat plate; so as to omit the base material required for each film layer, be conducive to the light and thin design of the device, and reduce assembly complexity of the near-eye display device.

Since the flat plate 3 has a certain natural reflectivity, a part of the light is still reflected when the light is incident on the surface thereof, so that the part of the light is reflected by the flat plate into the near-eye display device, which affects the imaging light. In the embodiments of the present disclosure, in order to avoid the above problems, as shown in FIG. 6, an anti-reflecting film 8 is arranged on a surface of one side, facing away from the polarizing layer 6, of the flat plate 3, so as to increase transmission of the imaging light, suppress the reflection of the ambient light and the stray light at the same time, and optimize the imaging effect of the near-eye display device.

The curved mirror 7 is not only configured to reflect the imaging light passing through the imaging lens 2 and the like, but also configured to transmit the ambient light, so a transflective film may be arranged on at least one of the surface of one side, facing the polarization beam-splitting layer 5, of the curved mirror 7 and the surface of one side, facing away from the polarization beam-splitting layer 5, of the curved mirror 7. In order to ensure contrast of the displayed image in a strong ambient light atmosphere, reflectivity of the transflective film may range from 50% to 70%.

The near-eye display device provided by the embodiments of the present disclosure includes: the display screen configured to display images; the imaging lens located at the light emitting side of the display screen and configured to image the displayed image of the display screen; the flat plate located on one side, facing away from the display screen, of the imaging lens and obliquely arranged relative to the optical axis of the imaging lens; the phase retardation layer located on one side, facing the imaging lens, of the flat plate; the polarization beam-splitting layer located between the phase retardation layer and the flat plate, where the polarization beam-splitting layer is configured to transmit the first linearly polarized light and reflect the second linearly polarized light which has the polarization direction perpendicular to that of the first linearly polarized light; the polarizing layer located between the polarization beam-splitting layer and the flat plate, where the polarizing layer is configured to transmit the first linearly polarized light and absorb the second linearly polarized light; and the curved mirror located on the reflection light path of the polarization beam-splitting layer and located on one side, facing away from the flat plate, of the phase retardation layer; where the curved mirror is configured to reflect the reflected light of the polarization beam-splitting layer to the position of the human eyes and transmit the ambient light.

In the above near-eye display device provided by the embodiments of the present disclosure, the elements such as the phase retardation layer, the polarization beam-splitting layer, and the polarizing layer are adopted to convert the polarization state of the incident light for multiple times to suppress ghosting. The phase retardation layer, the polarization beam-splitting layer and the polarizing layer are arranged on one side, facing the curved mirror, of the flat plate, to make the stray light generated by not being sufficiently split by the polarization beam-splitting layer be absorbed by the polarizing layer before the stray light is incident on the flat plate for reflection, so as to avoid generation of ghosting. The structure of the above near-eye display device provided by the embodiments of the present disclosure can further prevent affecting the viewing image due to the fact that the ambient stray light is incident on the position of the human eyes.

Although the preferred embodiments of the present disclosure have been described, those skilled in the art can make additional modifications and variations on these embodiments once they know the basic creative concept. Therefore, the appended claim intends to be explained as including the preferred embodiments and all modifications and variations falling within the scope of the present disclosure.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A near-eye display device, comprising:
   a display screen, configured to display an image;
   an imaging lens, arranged at a light emitting side of the display screen and configured to image the displayed image of the display screen;
   a flat plate, arranged on one side facing away from the display screen, of the imaging lens; wherein the flat plate is obliquely arranged relative to an optical axis of the imaging lens;
   a phase retardation layer, arranged on one side, facing the imaging lens, of the flat plate;
   a polarization beam-splitting layer, arranged between the phase retardation layer and the flat plate; wherein the polarization beam-splitting layer is configured to transmit first linearly polarized light and reflect second linearly polarized light which has a polarization direction perpendicular to that of the first linearly polarized light;
   a polarizing layer, arranged between the polarization beam-splitting layer and the flat plate, wherein the polarizing layer is configured to transmit the first linearly polarized light and absorb the second linearly polarized light; and
   a curved mirror, arranged on a reflection light path of the polarization beam-splitting layer and arranged on one side, facing away from the flat plate, of the phase retardation layer; wherein the curved mirror is configured to reflect reflected light of the polarization beam-splitting layer to a position of human eyes and transmit ambient light;
   wherein the phase retardation layer, the polarization beam-splitting layer and the polarizing layer are sequentially arranged on the flat plate;
   wherein the flat plate is used for supporting the phase retardation layer, the polarization beam-splitting layer and the polarizing layer.

2. The near-eye display device according to claim 1, wherein a transmission axis of the polarization beam-splitting layer is parallel to a transmission axis of the polarizing layer.

3. The near-eye display device according to claim 1, wherein the polarizing layer is attached to a surface of the flat plate; and
   the phase retardation layer and the polarizing layer are attached to the polarization beam-splitting layer respectively.

4. The near-eye display device according to claim 3, wherein an anti-reflecting film is arranged on a surface of one side, facing away from the polarizing layer, of the flat plate.

5. The near-eye display device according to claim 1, wherein the phase retardation layer is a quarter-wave plate; and an included angle between an optical axis of the quarter-wave plate and a transmission axis of the polarization beam-splitting layer is 45°.

6. The near-eye display device according to claim 1, wherein an included angle between the flat plate and the optical axis of the imaging lens is 45°.

7. The near-eye display device according to claim 1, wherein the display screen is one of a liquid crystal display, an organic light emitting diode display, a miniature organic light emitting diode display, or a light emitting diode display.

8. The near-eye display device according to claim 1, wherein the imaging lens comprises at least one lens; and the lens adopts one of a spherical lens, an aspherical lens or a free-form lens.

9. The near-eye display device according to claim 1, wherein the curved mirror adopts one of a spherical lens, an aspherical lens or a free-form lens.

10. The near-eye display device according to claim 9, wherein a transflective film is arranged on a surface of one side of the curved mirror.

11. The near-eye display device according to claim 10, wherein reflectivity of the transflective film ranges from 50% to 70%.

12. The near-eye display device according to claim 1, wherein the near-eye display device is glasses or a helmet; and the curved mirror is multiplexed as an ophthalmic lens of the glasses or the helmet.

* * * * *